US008200714B2

(12) United States Patent
Schwartz

(10) Patent No.: US 8,200,714 B2
(45) Date of Patent: Jun. 12, 2012

(54) APPARATUS, SYSTEMS AND METHODS FOR CONFIGURABLE DEFAULTS FOR XML DATA

(75) Inventor: Jack Arthur Schwartz, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 454 days.

(21) Appl. No.: 12/463,280

(22) Filed: May 8, 2009

(65) Prior Publication Data

US 2010/0287184 A1 Nov. 11, 2010

(51) Int. Cl.
 *G06F 17/30* (2006.01)
(52) U.S. Cl. ............... 707/803; 707/804; 707/809
(58) Field of Classification Search .......... None
 See application file for complete search history.

(56) References Cited

U.S. PATENT DOCUMENTS

| | | | |
|---|---|---|---|
| 6,842,757 B1* | 1/2005 | Winer et al. ............... 1/1 |
| 7,107,521 B2* | 9/2006 | Santos ............... 715/235 |
| 7,437,664 B2* | 10/2008 | Borson ............... 715/234 |
| 7,487,515 B1* | 2/2009 | Jones et al. ............... 719/328 |
| 2005/0055631 A1* | 3/2005 | Scardina et al. ............... 715/513 |
| 2005/0172276 A1* | 8/2005 | Eilebrecht ............... 717/143 |
| 2006/0004887 A1* | 1/2006 | Schenk ............... 707/204 |
| 2006/0044319 A1* | 3/2006 | Molesky et al. ............... 345/581 |
| 2007/0083543 A1* | 4/2007 | Chen ............... 707/102 |
| 2007/0100871 A1* | 5/2007 | Clemm et al. ............... 707/102 |
| 2007/0112851 A1* | 5/2007 | Tomic et al. ............... 707/104.1 |
| 2007/0124373 A1* | 5/2007 | Chatterjee et al. ............... 709/204 |
| 2009/0172005 A1* | 7/2009 | LaToza et al. ............... 707/102 |
| 2009/0254806 A1* | 10/2009 | Bitonti et al. ............... 715/234 |
| 2009/0254812 A1* | 10/2009 | Vion-Dury et al. ............... 715/239 |
| 2010/0011283 A1* | 1/2010 | Wray ............... 715/234 |

OTHER PUBLICATIONS

Hovnanian and Skedgell posts, "Sax Parser and HTML" thread, Rob Skedgell post of Feb. 17, 2006, http://www.javakb.com/Uwe/Forum.aspx/java-setup/7888/SAX-Parser-and-HTML.*
Jack Schwartz "Please review: enhanced nodepathing for XML data parsing," Aug. 18, 2008.*
Reynaud et al. A XML-based Description Language and Execution Environment for Orchestrating Grid Jobs, IEEE, 2005, all pages.*
Schwartz, Jack, "New XML DOM Tree Traversal Module," 2 pages, Apr. 4, 2008.
Schwartz, Jack, "Thread: Progress on Distro-Constructor Manifest," 19 pages, Mar. 25, 2008.
Schwartz, Jack, "Progress on Distro-Constructor Manifest," 16 pages, Apr. 4, 2008.

* cited by examiner

*Primary Examiner* — Robert Timblin
*Assistant Examiner* — Richard Bowen
(74) *Attorney, Agent, or Firm* — Polsinelli Shughart PC

(57) ABSTRACT

A data tree is generated in memory by parsing a first XML file. Default setting requests and validation requests are read from a second XML file. Default data values for nodes in the data tree are generated by executing default data generation code from locations specified in the default setting requests and recorded in the data tree. The content of data stored in nodes of the data tree is then validated by executing validation code from locations specified in the validation requests. The data tree is then searched by getting a nodepath, parsing the nodepath into a plurality of path pieces, searching the data tree based on each of the path pieces, and returning one or more nodes of the data tree based on the search that satisfy the path pieces. A data value of one or more nodes or child nodes may be specified to narrow the search.

20 Claims, 15 Drawing Sheets

In Backus Naur Form, the nodepath language is defined as:

<nodepath> ::= <node> | <nodepath> "/" <node>

<node> ::= <nodename> | <nodename> "=" <value> |
      <nodename> "["     <bracket_list> "]"

<bracket_list> ::= <path_value_pair> | <path_value_pair> ":" <path_value_pair>

<value> ::= <value> | '"' <value> '"'

<path_value_pair> ::= <valpath> "=" <value> where:

<nodename> is the name of the current node (element of attribute)

<value> is the value of a node (element or attribute)

<valpath> is the path from the current node to the node where <value> would be found

FIG. 3

```
<distribution>
    .
    .
    .
    <install_params>
        .
        .
        .
        <user name="Joe">
            <password>aXY3z2b</password>
        </user>
        .
        .
        .
    </install_params>
    .
    .
    .
</distribution>
```

FIG. 5

```
<defaults_and_validation_manifest>
    <helpers>
        .
        .
        .
            <default_setter ref="default_homedir"
                module="DefaultsValidationModule.py"
                method="homedir"/>
            <validator ref="validate_password"
                module=" DefaultsValidationModule.py"
                method="password"/>
        .
        .
        .
    </helpers>
    <default nodepath="distribution/install_params/user/homedir"
        from="helper" type="element">
            default_homedir
    </default>
    <default nodepath="distribution/install_params/user/shell"
        from="value" type="element">
            /bin/bash
    </default>
    <default nodepath="distribution/install_params/root/password"
        from="value" type="element" missing_parent="create">
            R00t
    </default>
    <validate nodepath="distribution/install_params/user/password">
        validate_password
    </validate>
    .
    .
    .
</defaults_and_validation_manifest>
```

```
def homedir(parent_node):
    parent_node_attrs = parent_node.get_attr_dict()
    name_str = parent_node_attrs["name"]
    return " /export/home/" + name_str
```

.
.
.

```
def password(value):
    found_lower = found_upper = found_digit = False
    for dchar in value:
        if (dchar.islower()):
            found_lower = True
        elif (dchar.isupper()):
            found_upper = True
        elif (dchar.isdigit()):
            found_digit = True
        if (found_lower == found_upper == found_digit == True):
            return True
    return False
```

```
<distribution>
    .
    .
    .
    <install_params>
        .
        .
        .
        <root>
            <password>R00t</password>
        </root>
        <user name="Joe">
            <shell>/bin/bash</shell>
            <password>aXY3z2b</password>
            <homedir>/export/home/Joe</homedir>
        </user>
        .
        .
        .
    </install_params>
    .
    .
    .
</distribution>
```

FIG. 12

APPARATUS, SYSTEMS AND METHODS FOR CONFIGURABLE DEFAULTS FOR XML DATA

FIELD OF THE INVENTION

Aspects of this invention relate generally to computer systems, and more specifically to configurable defaults for XML data.

BACKGROUND

Extensible Markup Language (XML) is a markup language designed to structure, store, and transport information. The purpose of XML is to aid information systems in sharing structured data, to encode documents, and to serialize data. XML data is stored as plain text in XML files. XML files contain a root element. This element is the parent of all other elements in the XML file. The elements in an XML file form a document tree. The tree starts at the root and branches to the lowest level of the tree. Elements can generally have child elements. Children elements on the same level are called siblings. Elements can generally have text content and attributes.

The XML DOM (Document Object Model) defines a standard way for accessing and manipulating XML files. The DOM views XML files as a tree-structure. All elements can be accessed through the DOM tree. The content of the elements (text and attributes) can be modified or deleted, and new elements can be created. The elements and their attributes are known as nodes.

XML files may be validated utilizing Document Type Definition (DTD) files or XML schema files. A DTD file or XML schema file defines the legal building blocks of an XML file. The DTD file or XML schema file defines the file structure with a list of legal elements and attributes. DTDs or XML schemas can be utilized to validate the structure of an XML file and the type of text content contained in elements and attributes. However, DTDs or XML schemas cannot be utilized to semantically validate the text content contained in elements or attributes. For example, DTDs or XML schemas cannot be utilized to validate that the text content of an element is within a subset of another element's text content. DTDs may also be utilized to specify default values for elements and attributes. However, these default values are hardwired and cannot be automatically calculated or adjusted to the data they service. For example, DTDs or XML schemas cannot be utilized to set a default of one XML element based on the text content of another XML element.

SUMMARY

A data tree is generated in memory by parsing a consumer input data XML file. Default setting requests are read from a data preprocessing instructions XML file. Default data values for nodes in the data tree are generated by executing default data generation code from locations specified in the default setting requests. The data tree is then modified by recording the default data values in the data tree.

Validation requests may also be read from the data preprocessing instructions XML file. The content of data stored in nodes of the data tree is then validated by executing validation code from locations specified in the validation requests.

The data tree may then be searched by getting a nodepath, parsing the nodepath into a plurality of path pieces, searching the data tree based on each of the path pieces, and returning one or more nodes of the data tree based on the search that satisfy the plurality of path pieces. A data value of one or more nodes or child nodes may be specified to narrow the search.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

FIG. 3 is a chart illustrating the Backus Naur Form of a nodepath language for searching XML data;

FIG. 5 is a chart illustrating a portion of an XML manifest file for a distribution constructor module (an example data consumer);

FIG. 7 is a chart illustrating a portion of an XML defaults and validation manifest file for the distribution constructor module, in accordance with one or more embodiments of the present disclosure;

FIG. 8 is a chart illustrating a Python™ code module implementing the default data generation code and validation code specified in the XML defaults and validation manifest file of FIG. 7, in accordance with one or more embodiments of the present disclosure;

FIG. 12 a chart illustrating the data tree 600c recorded in an XML file, in accordance with one or more embodiments of the present disclosure.

DETAILED DESCRIPTION

Aspects of the present disclosure provide apparatus, systems and methods for configuring defaults for XML (Extensible Markup Language) data. A data tree is generated in memory by parsing a consumer input data XML file. Default setting requests are read from a data preprocessing instructions XML file. Default data values for nodes in the data tree are generated by executing default data generation code from locations specified in the default setting requests. The data tree is then modified by recording the default data values in the data tree. This disclosure enables configurable defaults for XML data, as the code that is executed to generate defaults, as well as how that code generates defaults when executed, is configurable through the data preprocessing instructions XML file. Changes to the consumer input data XML file may not necessitate changes in the data preprocessing instructions XML file, and vice versa, as long as the consumer input data XML file and data preprocessing instructions XML file are kept in synch.

Validation requests may also be read from the data preprocessing instructions XML file. The content of data stored in nodes of the data tree is then validated by executing validation code from locations specified in the validation requests.

The data tree may then be searched by getting a nodepath, parsing the nodepath into a plurality of path pieces, searching the data tree based on each of the path pieces, and returning one or more nodes of the data tree based on the search that satisfy the plurality of path pieces. A data value of one or more nodes or child nodes may be specified to narrow the search.

Figure 1:
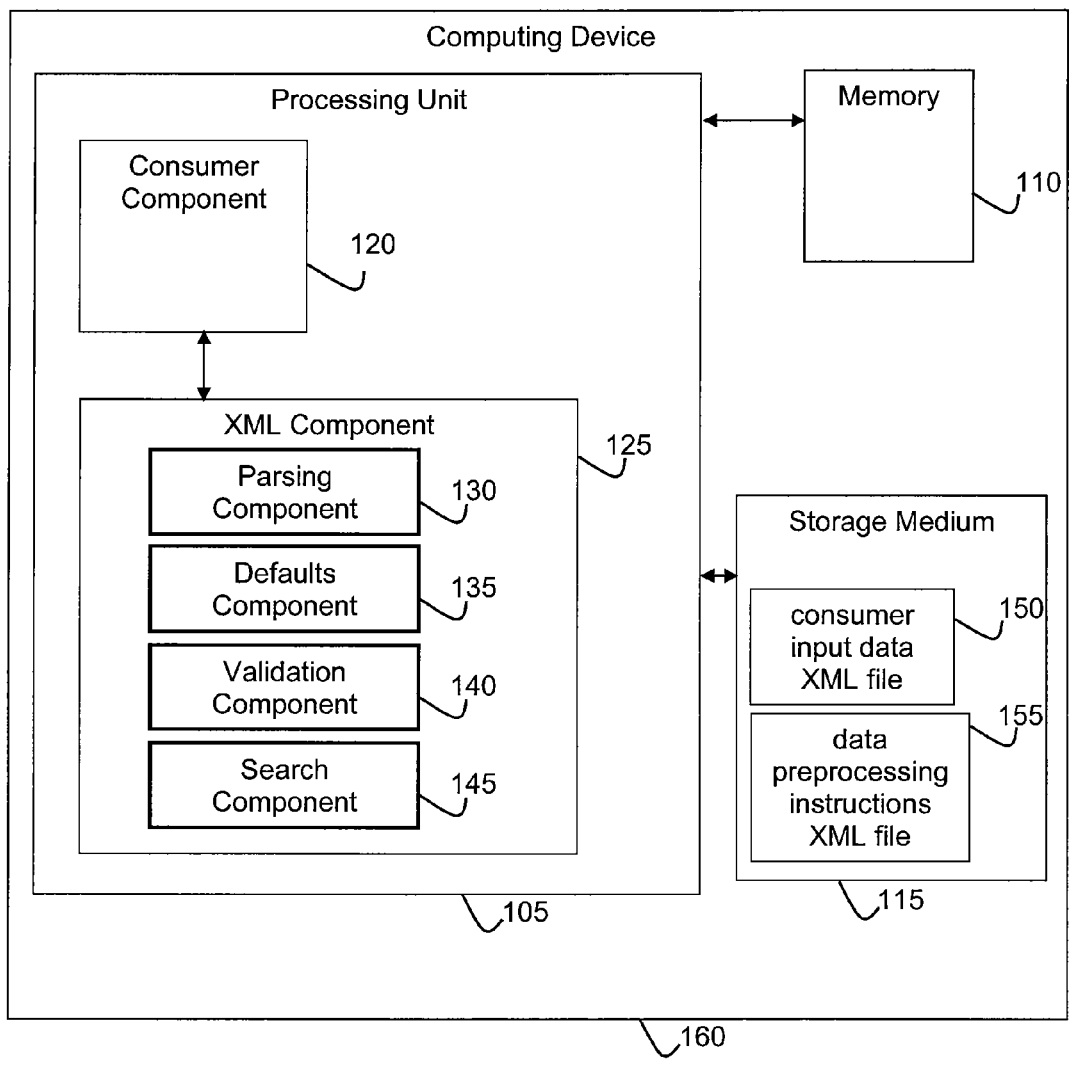
FIG. 1 is a block diagram illustrating a system 100 for configuring defaults for XML (extensible markup language) data, in accordance with one or more embodiments of the present disclosure.

FIG. 1 illustrates a system 100 for configuring defaults for XML data, in accordance with an embodiment of the present disclosure. The system 100 involves a computing device 160. The computing device 160 includes a processing unit 105, which is operable to execute instructions implementing an XML data consumer component 120 and an XML component 125, and a memory 110. The XML component 125 may include a parsing component 130, a defaults component 135, a validation component 140, and/or a search component 145. The computing device 160 also includes a tangible machine-readable storage medium 115, operable to store a consumer input data XML file 150 and a data preprocessing instructions XML file 155. The tangible machine-readable storage medium 115 may constitute any tangible machine-readable storage medium capable of storing electronic information, such as a flash drive or a hard disk drive.

The computing device 160 may include any kind of computing device such as a personal computer, a server computer, a laptop computer, a personal digital assistant, or a cellular telephone. The computing device 160 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

The XML data consumer component 120 may include any component that needs access to XML data and the XML component 125 may process XML data for the XML data consumer component 120 and may provide the XML data consumer component 120 with access to the processed XML data. The XML data consumer component 120, the XML component 125, parsing component 130, a defaults component 135, a validation component 140, and/or a search component 145 may be implemented as one or more Python™ modules. The one or more Python™ modules may be stored in the memory 110 and/or the tangible machine-readable storage medium 115. The defaults component 135 may be implemented by executing a default setter driver module which executes a default generation method module. The default setter driver module may execute the default generation method module to generate defaults and then record the defaults generated by the default generation method module. The validation component 140 may be implemented by executing a validation driver module which executes a validation method module. The validation driver module may execute the validation method module to validate the content of data stored in nodes of the data tree. Additionally, though the XML component 125 is described as including parsing component 130, a defaults component 135, a validation component 140, and/or a search component 145, the described functionality may be implemented as any number of components, whether separate or integrated into a composite component, without departing from the scope of the present disclosure. For example, the functionality of the defaults component 135 and the validation component 140 may be performed by a single component.

It is understood that the system 100 is merely an example, and that the system 100 may include more than one computing device 160, processing unit 105, memory 110, and/or tangible machine-readable storage medium 115 without departing from the scope of the present disclosure.

Figure 2:
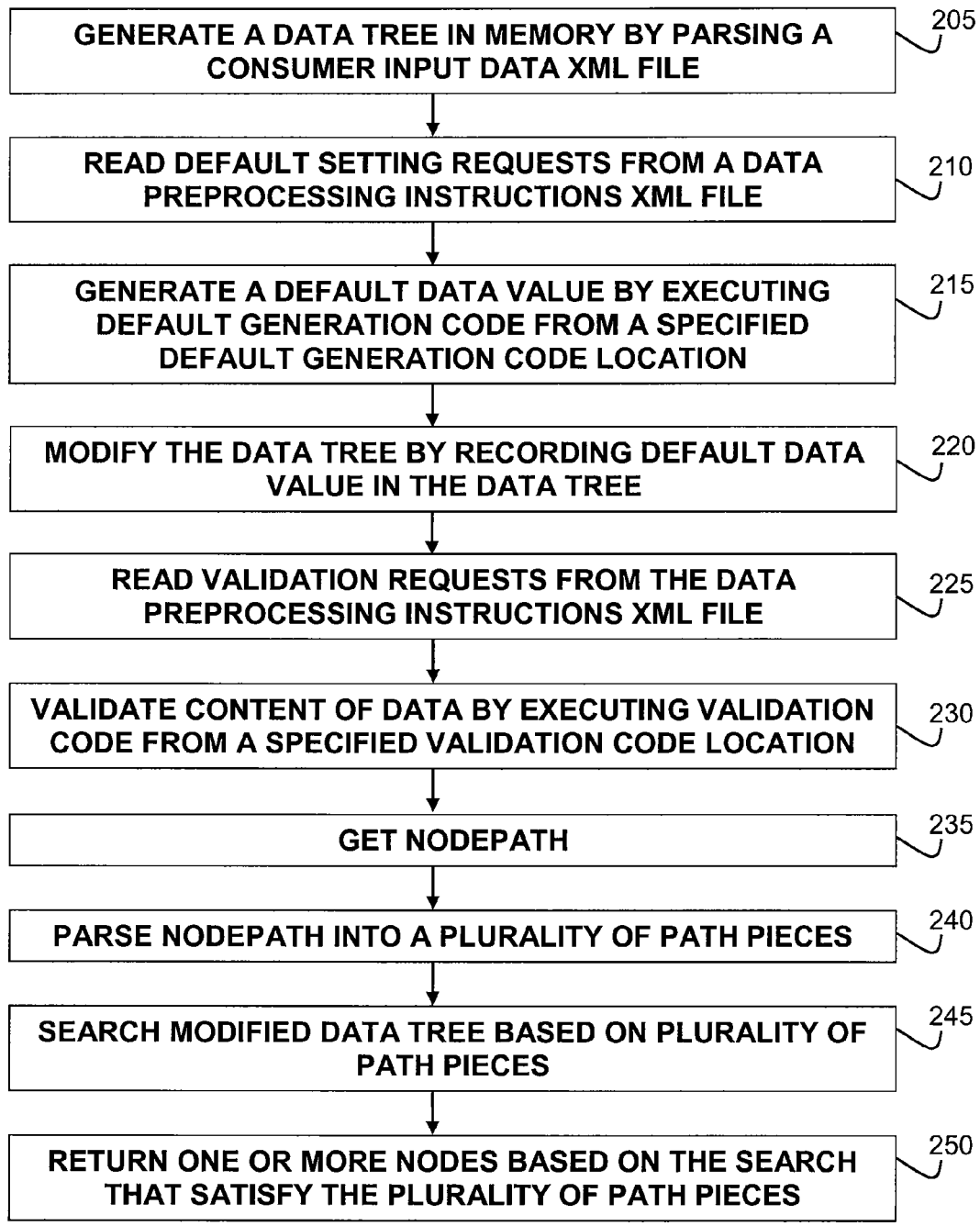
FIG. 2 is a method diagram illustrating a method 200 for configuring defaults for XML data, which may be performed by the system 100 of FIG. 1, in accordance with one or more embodiments of the present disclosure.

FIG. 2 illustrates a method 200 for configuring defaults for XML data, which may be performed by the system 100, in accordance with one or more embodiments of the present disclosure. The method 200 may comprise a computer-implemented method, with the method performed by a processing unit, such as the processing unit 105, executing one or more sets of instructions included in a computer program product stored in a machine-readable media, such as the tangible machine-readable storage medium 115 and/or the memory 110.

In a first operation 205, the parsing component 130 generates a data tree in the memory 110 by parsing the consumer input data XML file 150. The data tree may include a plurality of nodes arranged in a hierarchical parent-child relationship. The parsing component 130 may be a DOM (document object module) XML parsing component and the data tree may be a DOM data tree.

In a second operation 210, the defaults component 135 reads one or more default setting requests for one or more nodes of the plurality of nodes in the data tree from the data preprocessing instructions XML file 155. The default setting requests may specify the location of default data generation code that is executable by the processing unit 105 to generate a default data value for the one or more nodes. The location of the default data generation code may include a reference that can be utilized to refer to the default data generation code, a specification of a module that contains the default data generation code, and a specification as to one or more methods in the module that constitute the default data generation code. Before the defaults component 135 reads the one or more default setting requests, the defaults component 135 and/or the XML component 125 may check to validate that the data preprocessing instructions XML file 155 conforms to an XML schema for the data preprocessing instructions XML file 155. The XML schema for the data preprocessing instructions XML file 155 may constitute a Relax NG (REgular LAnguage for XML Next Generation) schema.

In a third operation 215, the defaults component 135 generates a default data value for the one or more nodes in the data tree by executing the default data generation code from the specified location. Executing the default data generation code on the data tree may generate a default data value for the one or more nodes in the data tree. These values may be based on a data value of one or more other nodes of the plurality of nodes, or may be calculated by some other algorithm.

Some of the default setting requests may include specifying a default data value for the one or more nodes instead of a location of default data generation code. In this case, the defaults component 135 may utilize the specified default data value for the one or more nodes instead of generating the default data value by executing default data generation code.

Some of the default setting requests may be for one or more nodes that do not have a parent node in the data tree. In this case, the defaults component 135 may detect that the parent node is not present in the data tree and add the parent node to the data tree, skip the respective default setting request, or generate an error. The respective default setting request may specify whether the defaults component 135 should add a parent node, skip the default setting request, or generate an error if the parent node is not present in the data tree.

In a fourth operation 220, the defaults component 135 modifies the data tree in the memory 110 by recording the default data value for the one or more nodes in the data tree in the memory 110. The defaults component 135 may record the modified data tree in an XML file stored in the tangible machine-readable storage medium 115, such as the consumer input data XML file 150 and/or a third XML file. The defaults component 135 and/or the XML component 125 may check to validate that the modified data tree conforms to an XML schema. The XML schema may constitute a Relax NG (REgular LAnguage for XML Next Generation) schema.

In some embodiments, the method 200 may include operations 225-230. In the fifth operation 225, the validation component 140 reads one or more validation requests for one or more nodes in the plurality of nodes in the data tree from the data preprocessing instructions XML file 155. The validation requests may specify the location of validation code that is executable by the processing unit 105 to validate data for the one or more nodes. The location of the validation code may include a reference that can be utilized to refer to the validation code, a specification of a module that contains the validation code, and a specification as to one or more methods in the module that constitute the validation code. Before the validation component 140 reads the one or more validation requests, the validation component 140 and/or the XML component 125 may check to validate that the data preprocessing instructions XML file 155 conforms to an XML schema for the data preprocessing instructions XML file 155. The XML schema for the data preprocessing instructions XML file 155 may constitute a Relax NG (REgular LAnguage for XML Next Generation) schema.

In the sixth operation 230, the validation component 140 validates the content of data stored in the one or more nodes by executing the validation code from the specified location on the data tree. Executing the validation code on the data tree may validate the content of data stored in the one or more nodes based on a data value of one or more other nodes of the plurality of nodes in the data tree, or some other algorithm. The validation component 140 may record the modified and validated data tree in an XML file stored in the tangible machine-readable storage medium 115, such as the consumer input data XML file 150 and/or a third XML file.

It is understood that although the validation component 140 is described as reading validation requests from the same XML file that the defaults component 135 reads default setting requests from, validation requests and default setting requests may be read from one or more different XML files.

Some of the validation requests may be for one or more nodes that are not present in the data tree. In this case, the validation component 140 may detect that one or more nodes are not present in the data tree and skip the respective validation request, skip the respective validation request if the parent node of the one or more nodes is also not present, and/or generate an error. The respective validation request may specify whether the validation component 140 should skip the validation request, skip the validation request if the parent is also missing, and/or generate an error if the one or more nodes are not present in the data tree.

In some embodiments, the method 200 may include operations 235-250. In the seventh operation 235 the search component 145 gets a nodepath. The search component 145 may get the nodepath based on input received by the computing device 160 from a user or may calculate the nodepath based on one or more nodes in the search component 145 needs to access.

The nodepath may include a concatenation of path pieces constituting a hierarchical path through the modified data tree from at least one parent node to at least one child node. In the eighth operation 240, the search component 145 parses the nodepath into a plurality of path pieces. Each path piece of the nodepath may specify the name of a node, the value of a node, and/or the value of one or more children of a node. FIG. 3 illustrates the language of the nodepath in Backus Naur Form.

Referring again to FIG. 2, in the ninth operation 245, the search component 145 searches the modified data tree based on each of the plurality of path pieces. Searching the modified data tree may include traversing one or more nodes in the modified data tree based on the plurality of path pieces and any given values of specific nodes.

In the tenth operation 250, the search component 145 returns one or more nodes in the modified data tree, based on the search, that satisfy the plurality of path pieces. The one or more nodes may satisfy the plurality of path pieces and any given values if their position in the hierarchy of the modified data tree can be reached by traversing one or more nodes in the modified data tree based on the plurality of path pieces.

Figure 4A:
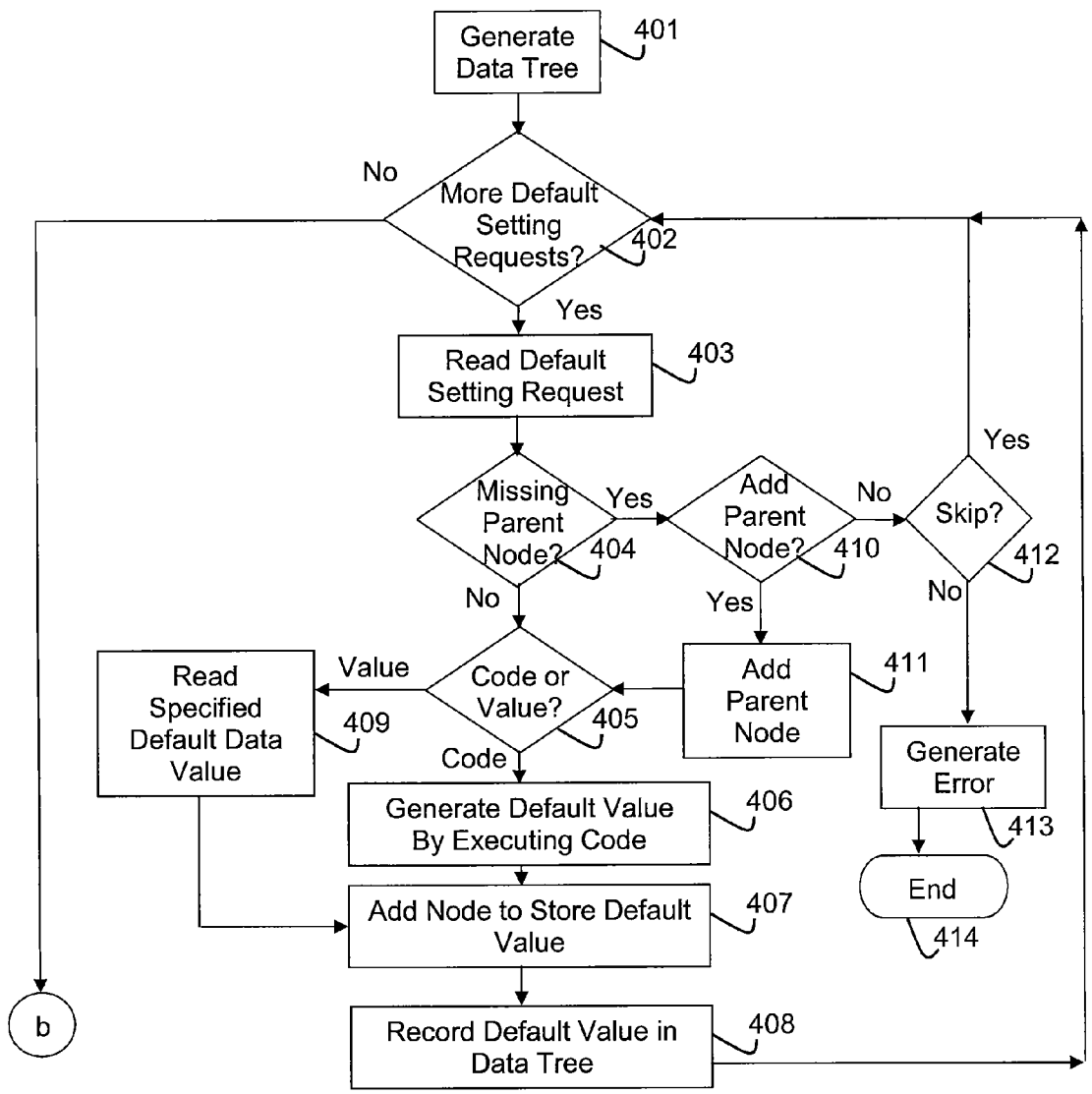
FIG. 4A is a flowchart illustrating an example flow 400 of method 200, in accordance with one or more embodiments of the present disclosure.
Figure 4B:
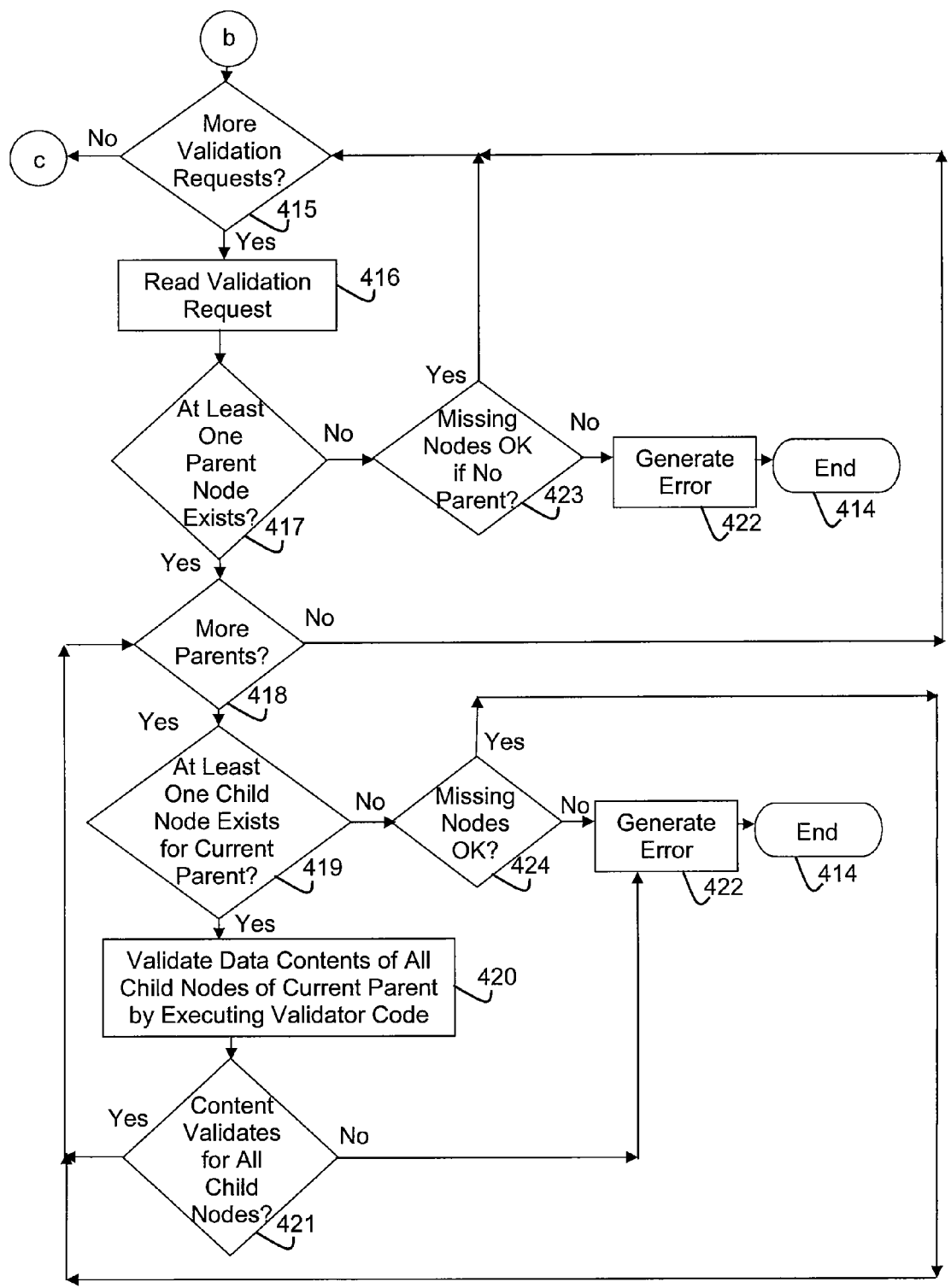
FIG. 4B is a continuation of the flowchart illustrated in FIG. 4A.
Figure 4C:
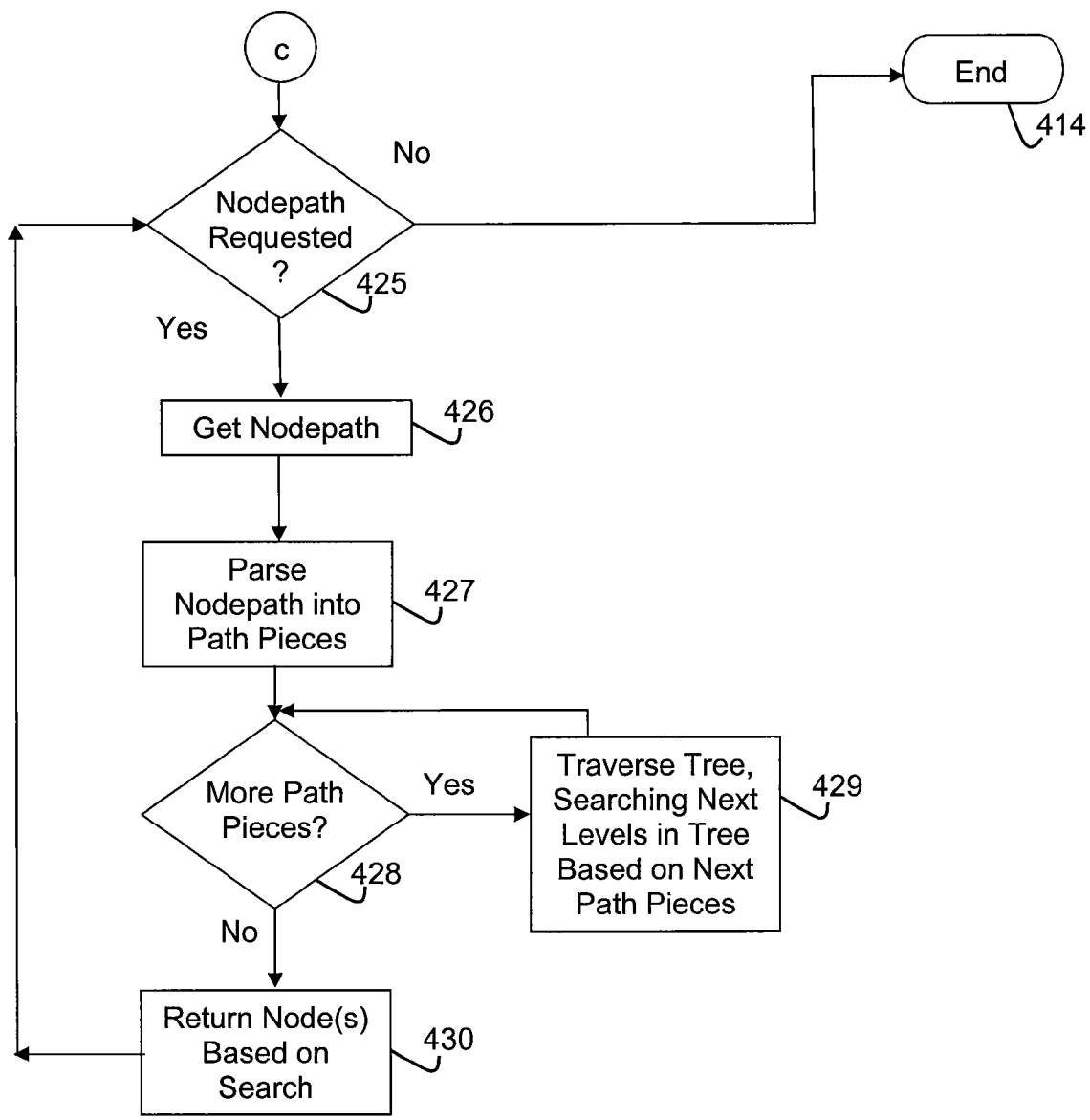
FIG. 4C is a continuation of the flowchart illustrated in FIG. 4B.

FIGS. 4A-4C are flowcharts illustrating an example flow 400 of method 200. Referring to FIG. 4A, at block 401, the parsing component 130 generates the data tree in memory 110 by parsing the consumer input data XML file 150 and processing proceeds to block 402. At block 402, the defaults component 135 reads the data preprocessing instructions XML file 155 and determines whether the data preprocessing instructions XML file 155 contains any unfulfilled default setting requests for one or more nodes in the data tree. If the data preprocessing instructions XML file 155 contains any unfulfilled default setting requests, processing proceeds to block 403. If the data preprocessing instructions XML file 155 does not contain any unfulfilled default setting requests, processing proceeds to block 415 (see FIG. 4B).

Referring again to FIG. 4A, at block 403, the defaults component 135 reads a default setting request from the data preprocessing instructions XML file 155 and processing proceeds to block 404. At block 404, the defaults component 135 determines whether the parent node of the node corresponding to the default setting request is present in the data tree. If the parent node is present in the data tree, processing proceeds to block 405. If the parent node is not present in the data tree, processing proceeds to block 410.

At block 405, the defaults component 135 determines whether the default setting request specifies a default data value or a location of default value generation code to execute to generate a default data value. If the default setting request specifies a location of default value generation code to execute to generate a default data value, processing proceeds to block 406. If the default setting request specifies a default data value, processing proceeds to block 409.

At block 406, the defaults component 135 executes the default value generation code on the data tree from the specified location to generate the default data value and processing proceeds to block 407. At block 407, the defaults component 135 adds the node to the place in the data tree corresponding to the nodepath, to store the default data value, and processing proceeds to block 408. At block 408, the defaults component 135 modifies the data tree by recording the default data value for the one or more nodes in the data tree and processing proceeds to block 402.

At block 409, the defaults component 135 reads the default data value specified in the default setting request and processing proceeds to block 407.

At block 410, the defaults component 135 determines whether the default setting request specifies to add missing parent nodes to the data tree. If the default setting request specifies to add missing parent nodes to the data tree, processing proceeds to block 411. If the default setting request does not specify to add missing parent nodes to the data tree, processing proceeds to block 412.

At block 411, the defaults component 135 adds the missing parent node to the data tree and processing proceeds to block 405.

At block 412, the defaults component 135 determines whether the default setting request specifies to skip the default setting request if the parent node is missing. If the default setting request specifies to skip if the parent node is missing, processing proceeds to block 402. If the default setting request does not specify to skip if the parent node is missing, processing proceeds to block 413. At block 413, the defaults component 135 generates an error and the processing proceeds to block 414. At block 414, the flow 400 ends.

Now referring to FIG. 4B, at block 415 the validation component 140 reads the data preprocessing instructions XML file 155 and determines whether the data preprocessing instructions XML file 155 contains any unfulfilled validation requests for one or more nodes in the data tree. If the data preprocessing instructions XML file 155 contains any unfulfilled validation requests, processing proceeds to block 416. If the data preprocessing instructions XML file 155 does not contain any unfulfilled validation requests, processing proceeds to block 425 (see FIG. 4C).

Referring again to FIG. 4B, at block 416 the validation component 140 reads a validation request from the data preprocessing instructions XML file 155 and processing proceeds to block 417. At block 417, the validation component 140 determines whether one or more parent nodes corresponding to the validation request are present in the data tree. If the one or more parent nodes are present, processing proceeds to block 418. If the one or more parent nodes are not present, processing proceeds to block 423.

At block 418, the validation component 140 determines whether there are more parent nodes to check which could have child nodes which correspond to the validation request. If there are more parent nodes to check, processing proceeds to block 419. If there are not more parent nodes to check, processing proceeds to block 415.

At block 419, the validation component 140 determines whether at least one child node exists for the current parent node being checked. If at least one child node exists for the current parent node, processing proceeds to block 420. If there are no child nodes existing for the current parent node, processing proceeds to block 424.

At block 420, the validation component 140 validates data contents of all child nodes of the current parent node by executing the validation code and processing proceeds to block 421. At block 421, the validation component 140 determines whether the any child node of the current parent node did not validate. If any child node of the current parent node did not validate, processing proceeds to block 422. If all child nodes validated, processing proceeds to block 418.

At block 422, the validation component 140 generates an error and the processing proceeds to block 414. It is understood that although flow 400 is illustrated as generating an error and ending when a single validation request fails, in some embodiments the result of validation requests may be stored and an error may be generated and flow 400 may end after all validation requests have been checked if any validation requests failed.

At block 423, the validation component 140 determines whether it is acceptable that no (child) nodes corresponding to the validation request exist even when there are no parent nodes present for those (child) nodes to be attached to. If it is acceptable that no (child) nodes exist even when no parent nodes exist, then processing proceeds to block 415. If it is not allowed that no (child) nodes exist even when no parent nodes exist, processing proceeds to block 422.

At block 424, the validation component 140 determines whether it is acceptable to have no nodes matching a validation request, under a given parent node. If it is acceptable for no nodes matching a validation request under a given parent node to exist, processing proceeds to block 418. If it is not acceptable for no nodes matching a validation request under a given parent node to exist, processing proceeds to block 422.

Referring now to FIG. 4C, at block 425 the search component 145 determines whether to search the modified data tree. If the search component 145 determines to search the modified data tree, processing proceeds to block 426. If the search component 145 determines to not search the modified data tree, processing proceeds to block 414.

At block 426, the search component 145 gets a nodepath and processing proceeds to block 427. At block 427, the search component 145 parses the nodepath into path pieces and processing proceeds to block 428. At block 428, the search component 145 determines whether there are more path pieces of the nodepath to be searched. If the search component 145 determines there are path pieces remaining, processing proceeds to block 429. If the search component 145 determines there are no path pieces remaining, processing proceeds to block 430.

At block 429, the search component 145 traverses the modified data tree, searching the next level of the modified data tree based on the next path piece and processing proceeds to block 428.

At block 430, the search component 145 returns one or more nodes in the modified data tree based on the search and processing proceeds to block 425.

Figure 6:
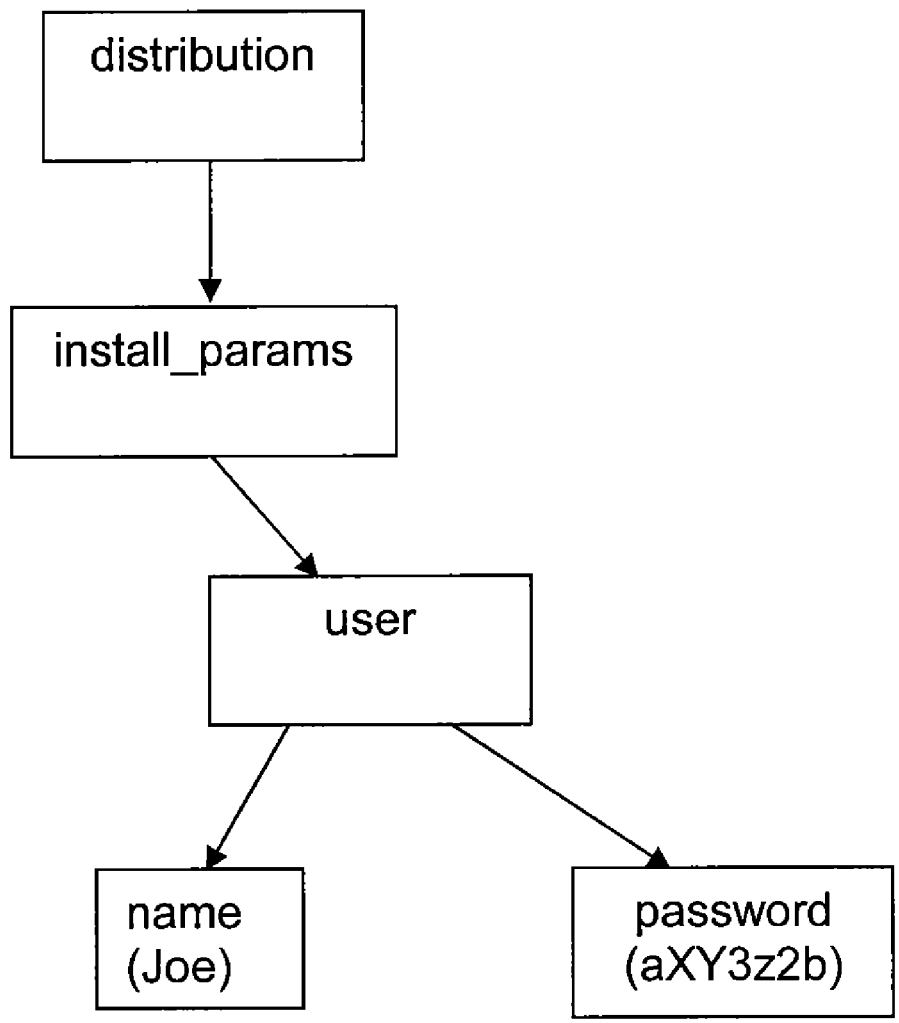
FIG. 6 is a block diagram illustrating a data tree 600a generated in memory by parsing the XML manifest file of FIG. 5, in accordance with one or more embodiments of the present disclosure.

By way of example, the XML data consumer component 120 may be a distribution constructor component for constructing an installable image of an operating system. In this case, the consumer input data XML file 150 may be a manifest XML file for the distribution constructor component and the data preprocessing instructions XML file 155 may be a defaults and validation manifest XML file for the distribution constructor component. FIG. 5 illustrates a portion of an example of the manifest XML file. The parser component 130 generates data tree 600*a* (see FIG. 6) in the memory 110 by parsing the manifest XML file of FIG. 5. As can be seen from FIG. 6, data tree 600*a* includes a plurality of nodes arranged in a hierarchical parent-child relationship.

FIG. 7 illustrates a portion of an example of the defaults and validation manifest XML file. As can be seen in FIG. 7, the defaults and validation manifest XML file includes a helpers section, three default setting requests, and a validation request.

The helpers section of the defaults and validation manifest XML file of FIG. 7 includes a specification for a default setter helper and a validation helper. The default setter helper includes a reference "default_homedir" to refer to the default setter helper, a specification that the default value generation code for the default setter helper is contained in the Python™ module "DefaultsValidationModule.py", and a specification that the "homedir" method in the DefaultsValidationModule.py module constitutes the default value generation code for the default setter helper. The validation helper includes a reference "validate_password" to refer to the validation helper, a specification that the validation code for the validation helper is contained in the Python™ module "DefaultsValidationModule.py", and a specification that the "password" method in the DefaultsValidationModule.py module constitutes the validation code for the validation helper.

The first of the three default setting requests includes a specification to set a default data value for the "homedir" node which is a child node of the "user" node, the "user" node a child node of the "install_params" node, and the "install_params" node is a child of the "distribution" node. The first default setting request also includes a specification that the default data value is to be generated by executing a helper and a specification that the node is an element. Finally, the first default setting request includes a specification to call the "default_homedir" helper to generate the default data value for the specified node.

Figure 9:
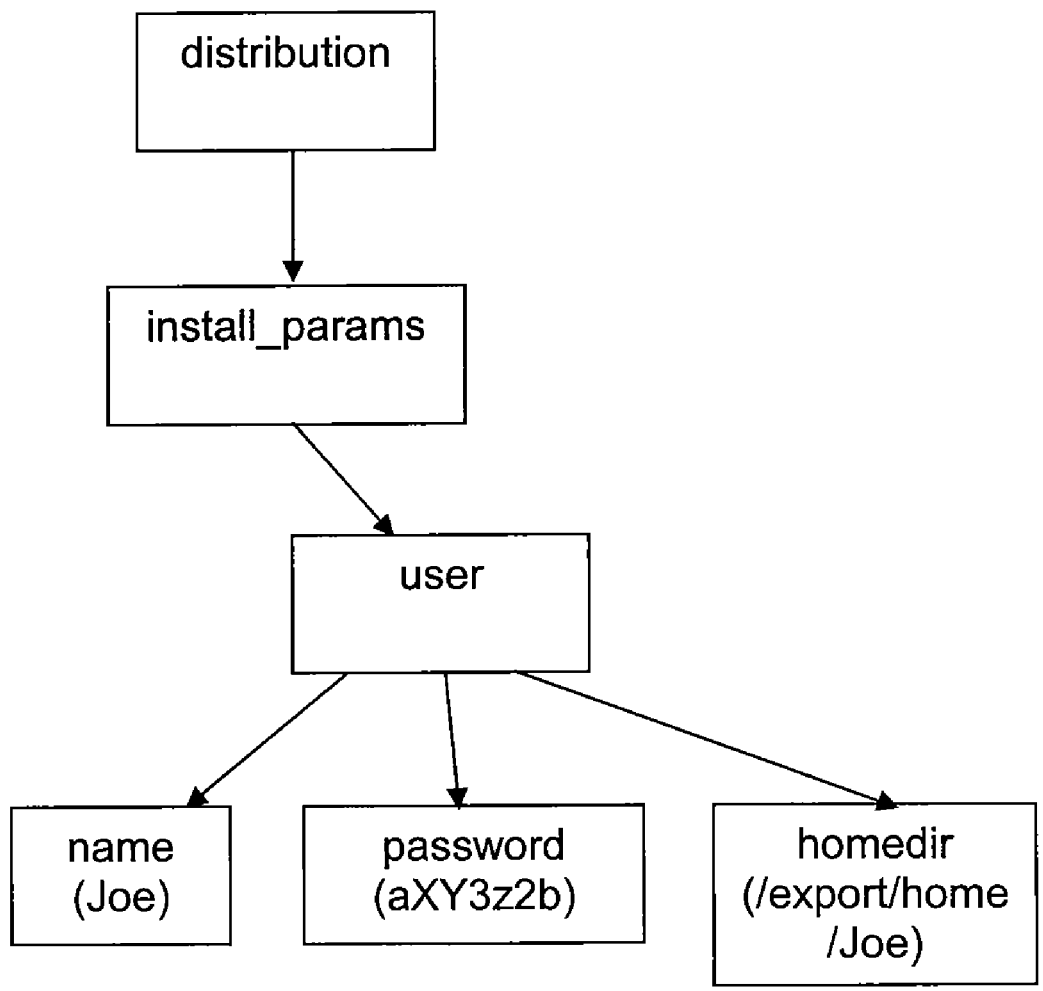
FIG. 9 is a block diagram illustrating a data tree 600b that is a modified version of the data tree 600a, in accordance with one or more embodiments of the present disclosure.

FIG. 8 illustrates a Python™ code example of the DefaultsValidationModule.py module. As can be seen, the "homedir" method obtains the attributes of the parent of the node it is called for and returns a string containing a concatenation of the string "/export/home" with the "name" attribute of the parent node. The defaults component 135 generates the default data value "/export/home/Joe" for the "homedir" node by executing the "default_homedir" helper, as specified in the first default setting request, and records the default data value in a modified data tree 600b (show in FIG. 9). It is noted that the "homedir" node did not exist in the data tree 600a and that the defaults module 135 created the "homedir" node when recording the default data value in the modified data tree 600b.

Referring again to FIG. 7, the second of the three default setting requests includes a specification to set a default data value for the "shell" node which is a child node of the "user" node, the "user" node a child node of the "install_params" node, and the "install_params" node is a child of the "distribution" node. The second default setting request also includes a specification that the default data value is given in the request and a specification that the node is an element. Finally, the second default setting request includes a specification that the default data value for the specified node is "bin/bash".

Figure 10:
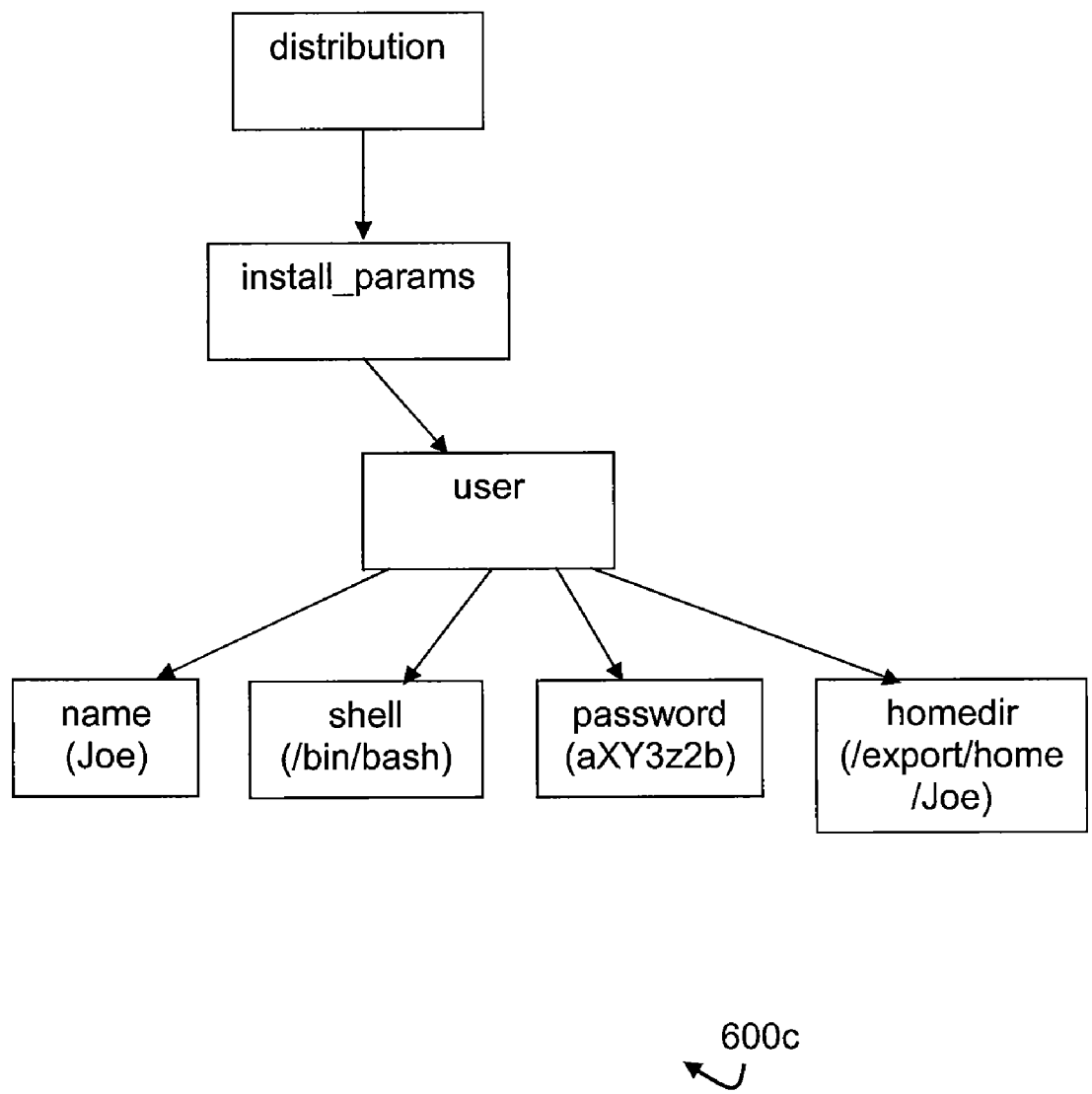
FIG. 10 is a block diagram illustrating a data tree 600c that is a modified version of the data tree 600b, in accordance with one or more embodiments of the present disclosure.

The defaults component 135 reads the specified default data value "/bin/bash" for the "shell" node, as specified in the second default setting request, and records the default data value in a modified data tree 600c (shown in FIG. 10). It is noted that the "shell" node did not exist in the data tree 600b and that the defaults component 135 created the "shell" node when recording the default data value in the modified data tree 600c.

Referring again to FIG. 7, the third of the three default setting requests includes a specification to set a default data value for the "password" node which is a child node of the "root" node, the "root" node a child node of the "install_params" node, and the "install_params" node is a child of the "distribution" node. The third default setting request also includes a specification that the default data value is given in the request, a specification that the node is an element, and a specification to create a parent node if the parent node is missing. Finally, the third default setting request includes a specification that the default data value for the specified node is "R00t".

Figure 11:
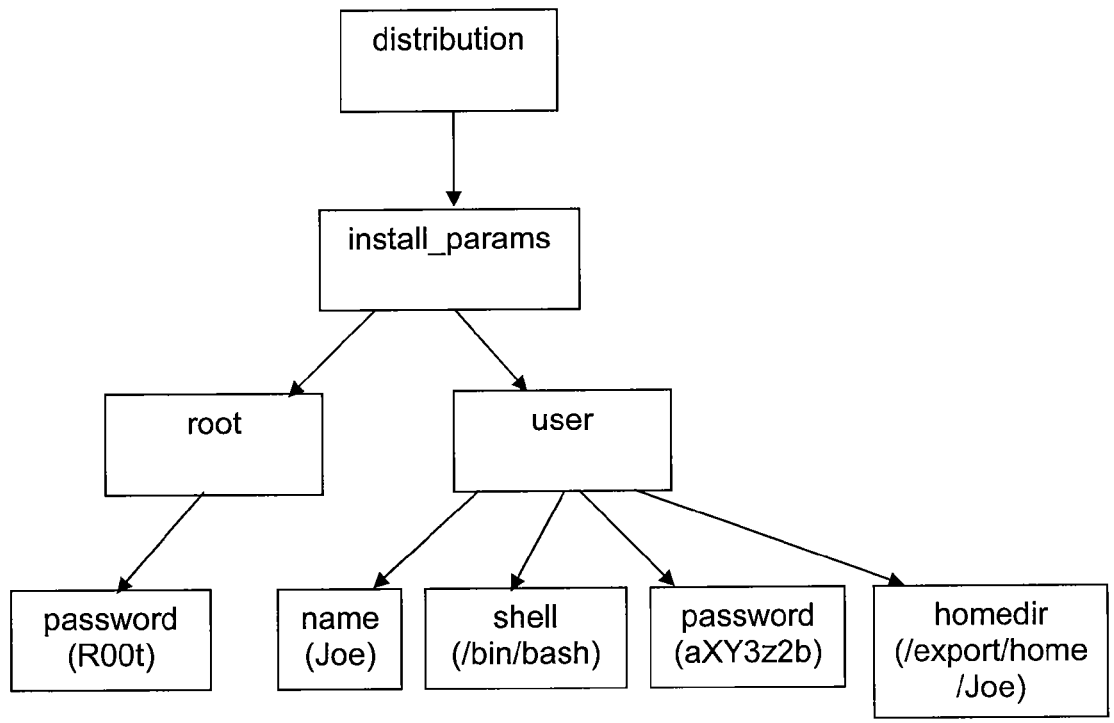
FIG. 11 is a block diagram illustrating a data tree 600c that is a modified version of the data tree 600b, in accordance with one or more embodiments of the present disclosure.

The defaults component 135 reads the specified default data value "R00t" for the "password" node, as specified in the third default setting request. The defaults component 135 detects that the parent node of the "password" node (the "root" node) does not exist in the data tree 600c. As specified in the third default setting request, the defaults component 135 creates the parent node "root". The defaults component 135 then records the default data value in a modified data tree 600d (shown in FIG. 11). It is noted that the "password" node did not exist in the data tree 600c and that the defaults component 135 created the "password" node when recording the default data value in the modified data tree 600d.

Referring again to FIG. 7, the validation request includes a specification to validate the content of the data for the "password" node which is a child node of the "user" node, the "user" node a child node of the "install_params" node, and the "install_params" node is a child of the "distribution" node. The validation setting request includes a specification to call the "validate_password" helper to validate the content of the data for the specified node.

Referring again to FIG. 8, the "password" method verifies that the content of the data of the specified node includes at least one lowercase letter, at least one uppercase letter, and at least one number. The defaults component 135 validates the content of the data for the "password" node by executing the "validate_password" helper, as specified in the validation request. The "validate_password" helper executes the "password" method to actually do the validation. As the content of the data for the "password" node is "zXY3z2b", execution of the "password" method will return true.

The XML component 105 then records the modified data tree 600d in an XML file, stored in the tangible machine-readable storage medium 115, as illustrated in FIG. 12. The XML file may be the consumer input data XML file 150 or may be a third XML file stored in the tangible machine-readable storage medium 115.

Referring again to FIG. 7, although the nodes referenced in the default setting requests and the validation requests are illustrated as described by the path from the root of the data tree to the node, it is understood that in some embodiments the root node of a data tree may be omitted when referencing nodes in the data tree. In this example, since the root node is always "distribution", reference to a node may omit specifying "distribution" and the root node "distribution" may be assumed.

Figure 13:
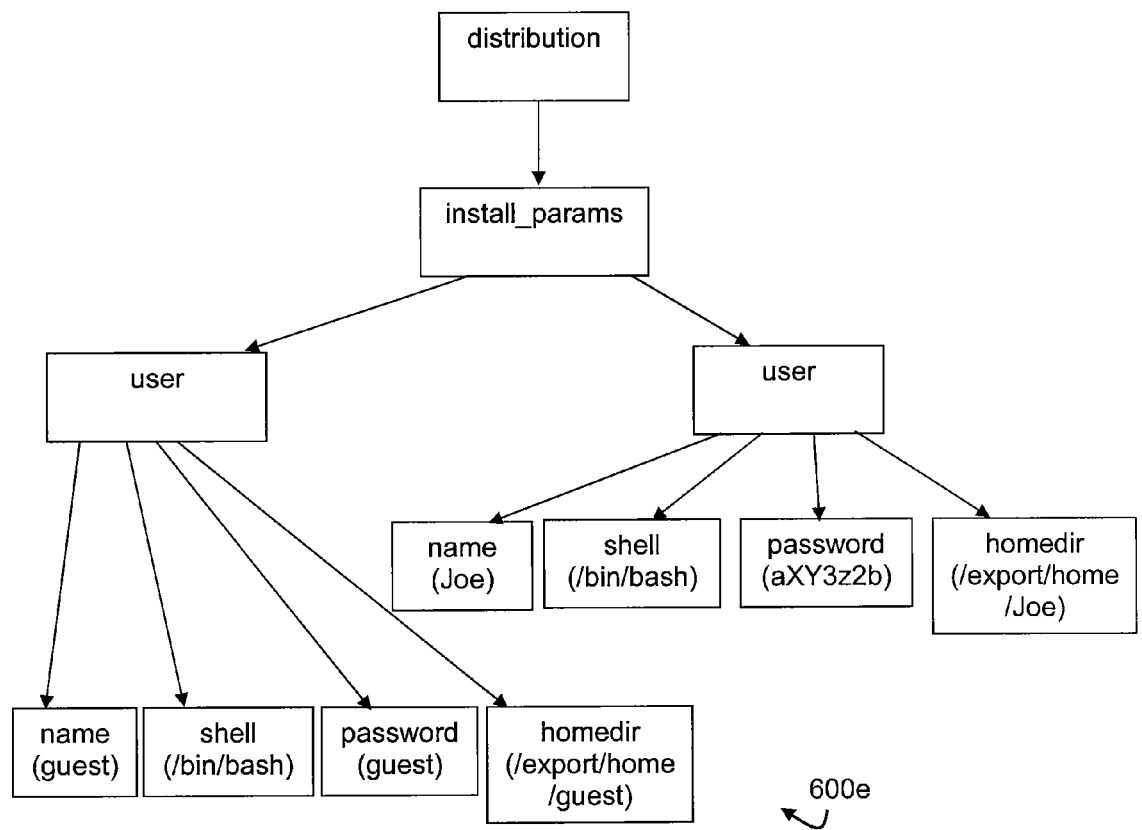
FIG. 13 is a block diagram illustrating a data tree 600e.

For the purpose of describing an example performance of operations 235-250 of method 200 by the search component 145, it is assumed that the data tree in memory is the data tree 600e illustrated in FIG. 13. The search component 145 gets a nodepath, parses the nodepath into a plurality of path pieces, searches the data tree 600e based on each of the plurality of path pieces, and returns one or more nodes, based on the search, that satisfy the plurality of path pieces.

For example, the XML component 125 may need to access the password node of the data tree 600e that represents the password for user "Joe". The search component 145 may get the nodepath "distribution/install_params/user/password". The search component 145 may then parse the nodepath into the path pieces "distribution", "install_params", "user", and "password". The search component 145 may then traverse the data tree 600e by searching the levels in the data tree 600e based on the path pieces and return the nodes that satisfy the path pieces. However, in this example both the "password" node that has a value of "guest" and the "password" node that has a value of "aXY3z2b" would be returned.

To get the value of the "password" node that corresponds to the user "Joe", the search component 145 may get the nodepath "distribution/install_params/user[homedir="export/home/Joe"]/password. The search component 145 may then parse the nodepath into the path pieces "distribution", "install_params", "user[homedir="export/home/Joe"]", and "password". The search component 145 may then traverse the data tree 600e by searching the levels in the data tree 600e based on the path pieces and return the nodes that satisfy the path pieces, as limited by the values given in the nodepath, in this case where distribution/install_params/user/homedir="export/home/Joe". Thus, only the "password" node that has a value of "aXY3z2b" would be returned.

It is understood that the above example is merely for the purposes of example. Although the present disclosure has been described in the context of configuring defaults, then validating data, and then searching, it is understood that the actions of configuring of defaults, validation of contents of data, and searching may be performed separately or in any combination without departing from the scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored instructions thereon, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
generating a data tree in at least one memory by parsing a first extensible markup language (XML) file, stored in at least one tangible computer-readable medium, utilizing at least one processing unit, the data tree comprising a plurality of nodes;
reading at least one default setting request for at least one node of the plurality of nodes from a second XML file, stored in the at least one tangible computer-readable medium, utilizing the at least one processing unit, the at least one default setting request comprising a specified default data generation code location of default data generation code to generate a default data value when executed;
generating the default data value for the at least one node by executing the default data generation code from the specified default data generation code location utilizing the at least one processing unit; and
modifying the data tree by recording the default data value for the at least one node in the data tree.

2. The computer-implemented method of claim 1, wherein said generating a default data value for the at least one node by executing the default data generation code from the specified default data generation code location utilizing the at least one processing unit comprises:
generating the default data value based on at least one other node in the plurality of nodes of the data tree.

3. The computer-implemented method of claim 1, further comprising:
reading at least one additional default setting request for at least one additional node of the plurality of nodes from the second XML file utilizing the at least one processing unit;
detecting the at least one additional node does not have a parent node in the data tree; and
performing at least one of the group comprising adding the parent node to the data tree, skipping the at least one additional default setting request, and generating an error.

4. The computer-implemented method of claim 1, further comprising:
reading at least one additional default setting request for at least one additional node of the plurality of nodes from the second XML file utilizing the at least one processing unit;
reading a specified default data value for the at least one additional node from the at least one additional default setting request; and
modifying the data tree by recording the specified default data value for the at least one additional node in the data tree.

5. The computer-implemented method of claim 1, further comprising:
reading at least one validation request for one or more nodes of the plurality of nodes from the second XML file utilizing the at least one processing unit, the at least one validation request comprising a specified validation code location of validation code to validate data when executed; and validating content of data stored in the one or more nodes by executing the validation code from the specified validation code location utilizing the at least one processing unit.

6. The computer-implemented method of claim 5, further comprising:

reading at least one additional validation request for one or more additional nodes of the plurality of nodes from the second XML file utilizing the at least one processing unit;

determining that the one or more additional nodes are not present in the data tree; and performing at least one of the group comprising generating an error, skipping the at least one additional validation request, and skipping the at least one additional validation request if the data tree does not comprise a parent node for the one or more additional nodes.

7. The computer-implemented method of claim 1, further comprising:

getting a nodepath, the nodepath comprising a hierarchical path through the modified data tree;

parsing the nodepath into a plurality of path pieces, at least one path piece of the plurality of path pieces comprising a name of a node of the plurality of nodes and a data value of the node;

searching the modified data tree based on the plurality of path pieces; and returning one or more nodes based on the search that satisfy the plurality of path pieces.

8. The computer-implemented method of claim 1, further comprising:

getting a nodepath, the nodepath comprising a hierarchical path through the modified data tree;

parsing the nodepath into a plurality of path pieces, at least one path piece of the plurality of path pieces comprising a name of a node of the plurality of nodes and at least one value path, the at least one value path comprising a child node value of a child node of the node;

searching the modified data tree based on the plurality of path pieces; and returning one or more nodes based on the search that satisfy the plurality of path pieces.

9. The computer-implemented method of claim 1, further comprising:

storing the modified data tree in a third XML file in the at least one tangible computer-readable medium utilizing the at least one processing unit.

10. A computing system, comprising:
at least one processing unit;
at least one memory, coupled to the at least one processing unit;
at least one tangible computer-readable storage medium, coupled to the at least one processing unit, configured to store a first extensible markup language (XML) file and a second XML file;
an XML parsing component, executable by the at least one processing unit, configured to generate a data tree in the at least one memory by parsing the first XML file, the data tree comprising a plurality of nodes; and
a default setting component, executable by the at least one processing unit, configured to read at least one default setting request for at least one node of the plurality of nodes from the second XML file, the at least one default setting request comprising a specified default data generation code location of default data generation code executable to generate a default data value;
wherein the default setting component is configured to generate the default data value for the at least one node by executing the default data generation code from the specified default data generation code location, the default setting component is configured to modify the data tree by recording the default data value for the at least one node in the data tree, and the processing unit is configured to store the modified data tree in a third XML file in the at least one tangible computer-readable storage medium.

11. The system of claim 10, wherein the default data value is generated based on at least one other node in the plurality of nodes of the data tree.

12. The system of claim 10, wherein the default setting component is configured to detect that the at least one node does not have a parent node in the data tree and perform at least one of the group comprising adding the parent node to the data tree, skipping the at least one default setting request, and generating an error.

13. The system of claim 10, wherein the default setting component is configured to read at least one additional default setting request for at least one additional node of the plurality of nodes from the second XML file, the at least one additional default setting request comprises a specified default data value for the at least one additional node, and the default setting component is configured to modify the data tree by recording the specified default data value for the at least one additional node in the data tree.

14. The system of claim 10, further comprising:
a validation component, executable by the at least one processing unit, configured to read at least one validation request for one or more nodes of the plurality of nodes from the second XML file, the at least one validation request comprising a specified validation code location of validation code executable to validate data;
wherein the validation component is configured to validate content of data stored in the one or more nodes by executing the validation code from the specified validation code location.

15. The system of claim 14, wherein the validation component is configured to detect that the one or more nodes are not present in the data tree and perform at least one of the group comprising generating an error, skipping the at least one validation request, and skipping the at least one validation request if the data tree does not comprise at least one parent node for the one or more additional nodes.

16. The system of claim 10, further comprising:
a searching component, executable by the at least one processing unit, configured to:
get a nodepath, the nodepath comprising a hierarchical path through the modified data tree;
parse the nodepath into a plurality of path pieces, at least one path piece of the plurality of path pieces comprising a name of a node of the plurality of nodes and a data value of the node;
search the modified data tree based on the plurality of path pieces; and
return one or more nodes based on the search that satisfy the plurality of path pieces.

17. The system of claim 10, further comprising:
a searching component, executable by the at least one processing unit, configured to:
get a nodepath, the nodepath comprising a hierarchical path through the modified data tree;

parse the nodepath into a plurality of path pieces, at least one path piece of the plurality of path pieces comprising a name of a node of the plurality of nodes and at least one value path, the at least one value path comprising a child node value of a child node of the node;

search the modified data tree based on the plurality of path pieces; and return one or more nodes based on the search that satisfy the plurality of path pieces.

18. A computer program product, including a computer readable storage medium and instructions, executable by a processing unit, tangibly embodied in the computer readable storage medium, the instructions comprising:

a first set of instructions configured to generate a data tree in at least one memory by parsing a first extensible markup language (XML) file, stored in at least one tangible computer-readable medium, utilizing at least one processing unit, the data tree comprising a plurality of nodes;

a second set of instructions configured to read at least one default setting request for at least one node of the plurality of nodes from a second XML file, stored in the at least one tangible computer-readable medium, utilizing the at least one processing unit, the at least one default setting request comprising a specified default data generation code location of default data generation code executable to generate a default data value;

a third set of instructions configured to generate the default data value for the at least one node by executing the default data generation code from the specified default data generation code location utilizing the at least one processing unit; and a fourth set of instructions configured to modify the data tree by recording default data value for the at least one node in the data tree.

19. The computer program product of claim 18, comprising:

a fifth set of instructions configured to read at least one validation request for one or more nodes of the plurality of nodes from the second XML file utilizing the at least one processing unit, the at least one validation request comprising a specified validation code location of validation code executable to validate data; and a sixth set of instructions configured to validate content of data stored in the one or more nodes by executing the validation code from the specified validation code location utilizing the at least one processing unit.

20. The computer program product of claim 18, further comprising:

a fifth set of instructions configured to get a nodepath, the nodepath comprising a hierarchical path through the modified data tree; and a sixth set of instructions configured to parse the nodepath into a plurality of path pieces, at least one path piece of the plurality of individual paths comprising a name of a node of the plurality of nodes and at least one selected from the group comprising a data value of the node and at least one value path, the at least one value path comprising a child node value of a child node of the node;

a seventh set of instructions configured to search the modified data tree based on the plurality of path pieces; and an eighth set of instructions configured to return one or more nodes based on the search that satisfy the plurality of path piece.

* * * * *